United States Patent
Charles et al.

(10) Patent No.: US 11,567,669 B1
(45) Date of Patent: Jan. 31, 2023

(54) DYNAMIC LATENCY MANAGEMENT OF ACTIVE-ACTIVE CONFIGURATIONS USING MULTI-PATHING SOFTWARE

(71) Applicant: Dell Products L.P., Round Rock, TX (US)

(72) Inventors: Peniel Charles, Bangalore (IN); Vighneshwar Hegde, Bangalore (IN); Gopinath Marappan, Coimbatore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/546,157

(22) Filed: Dec. 9, 2021

(51) Int. Cl.
G06F 3/06 (2006.01)

(52) U.S. Cl.
CPC ............ G06F 3/0613 (2013.01); G06F 3/067 (2013.01); G06F 3/0635 (2013.01); G06F 3/0659 (2013.01)

(58) Field of Classification Search
CPC .... G06F 3/0613; G06F 3/0635; G06F 3/0659; G06F 3/067
See application file for complete search history.

(56) References Cited

U.S. PATENT DOCUMENTS

| | | | |
|---|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

TerBush, Ryan. Development and performance-testing of Multi-Path I/O algorithms on V-Series systems. Diss. Massachusetts Institute of Technology, 2013. (Year: 2013).*

(Continued)

*Primary Examiner* — Nicholas J Simonetti
(74) *Attorney, Agent, or Firm* — Ryan, Mason & Lewis, LLP (57) ABSTRACT

An apparatus comprises a host device that includes a multi-path input-output (MPIO) driver configured to control delivery of input-output (IO) operations from the host device to first and second storage systems over a plurality of paths through a network. The MPIO driver determines latency values for the paths to the first and second storage systems, retrieves additional information corresponding to the paths and first and second storage systems, generates a first message comprising at least portions of the latency values and additional information, and sends the first message to a multi-pathing management appliance. A second message is received from the multi-pathing management appliance, the second message being generated based on at least a portion of the first message. The MPIO driver selects one or more paths for delivery of given ones of the IO operations based at least in part on at least a portion of the second message.

20 Claims, 4 Drawing Sheets

(56) References Cited

U.S. PATENT DOCUMENTS

| | | |
|---|---|---|
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 11,392,329 B1* | 7/2022 | Tylik .................. G06F 3/0683 |
| 11,422,718 B1* | 8/2022 | Chauhan ............. G06F 3/0635 |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salil |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1* | 6/2020 | Mallick .................. H04L 45/24 |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |
| 2022/0091761 A1* | 3/2022 | Patel .................. G06F 3/0605 |
| 2022/0179580 A1* | 6/2022 | Anchi .................. G06F 3/0635 |
| 2022/0206871 A1* | 6/2022 | Armangau ........... G06F 9/5016 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

Kris Piepho, "Dell EMC SC Series Storage: Microsoft Multipath I/O," Dell EMC Best Practices, Jan. 2017, 57 pages.

NVM Express, "Nvm Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

J. Langemak, "FCIDs, WWNs, Zoning, and VSANs," https://www.dasblinkenlichten.com/fcids-wwns-zoning-and-vsans/, Jan. 18, 2011, 10 pages.

dell.com, "PowerPath for Solaris: PowerPath for Solaris is notreporting correctly the devices in a SRDF metroconfiguration. Proximity is not functioning," https://www.dell.com/support/kbdoc/en-us/000058577/powerpath-for-solaris-is-not-reporting-correctly-the-devices-in-a-srdf-metro-configuration-proximity-is-not-functioning, Nov. 20, 2020, 4 pages.

flackbox.com, "Fibre Channel SAN Part 3—Fabric Login," https://www.flackbox.com/fibre-channel-san-part-3-flogi-plri-login, Accessed Oct. 22, 2021, 15 pages.

dell.com, "VPLEX," https://www.dell.com/community/VPLEX/VPLEX-What-is-IT-nexus/td-p/7126843, Accessed Oct. 22, 2021, 4 pages.

(56) References Cited

OTHER PUBLICATIONS

D. Tonnesen, "Learn How to Integrate the PowerMax with VMware Technologies," https://drewtonnesen.wordpress.com/2016/10/17/ppve-6-1_asb/, Oct. 17, 2016, 6 pages.

* cited by examiner

DYNAMIC LATENCY MANAGEMENT OF ACTIVE-ACTIVE CONFIGURATIONS USING MULTI-PATHING SOFTWARE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (TO) operations for delivery over paths from the host devices to storage ports of the storage system. The storage ports are typically limited in number and each has limited resources for handling IO operations received from the host devices. Different ones of the host devices can run different applications with varying workloads and associated IO patterns. The storage systems can have multiple storage arrays configured in an active-active storage configuration, e.g., data stored in one of the storage arrays can be replicated to another one of the storage arrays utilizing a synchronous replication process. One illustrative reason for an active-active storage configuration is to provide data services with continuous availability to applications which demand high resiliency and cannot afford downtime. In high availability environments, where storage devices from multiple arrays are presented to host devices or host device clusters as a single virtual device, the paths to the array logical units (LUNs) of the different arrays encounter varying levels of latency.

SUMMARY

Illustrative embodiments configure a multi-path layer of one or more host devices to include latency management functionality in connection with paths utilized to communicate with multiple storage systems, such as first and second storage systems arranged in an active-active configuration. The paths illustratively comprise paths through a storage area network (SAN) or other type of network over which one or more host devices communicate with a storage array or other type of storage system.

The multi-path layer illustratively comprises at least one multi-path input-output (MPIO) driver configured to process IO operations of at least one host device that communicates with multiple distinct storage arrays or other types of storage systems. The multi-path layer in such arrangements includes latency management logic configured to determine latency values for paths to first and second storage systems arranged in an active-active configuration, and to retrieve additional information corresponding to the paths and the first and second storage systems. The MPIO driver generates and sends to a multi-pathing management appliance, a first message comprising the latency values and the additional information. Based at least in part on a second message from the multi-pathing management appliance, the MPIO driver selects one or more paths for delivery of given ones of the IO operations to the first or second storage system.

In one or more embodiments, the MPIO driver determines whether latency values for paths to a given storage system of the first and second storage systems are higher than latency values for paths to the remaining storage system of the first and second storage systems. The second message from the multi-pathing management appliance is based at least in part on the latency values for the paths to the given storage system being higher than the latency values for the paths to the remaining storage system, and comprises an instruction to utilize paths corresponding to the remaining storage system.

In different scenarios as explained in more detail herein, changes in latency over IO operation paths are dynamic, where higher latencies may be sustained over an extended period of time before improving. Under conventional approaches, during initial configuration, MPIO drivers designate an array with the least latency as the local array and an array with higher latency as the remote array. The MPIO driver continues to use the designated array even if the latency changes and the latency of the remaining array falls below the latency of the designated array. In other words, under current approaches, MPIO driver detection of an optimal array is not dynamic. As a result, a designated local array is continuously used for IO operations, even if the designated local array has issues like higher latency and higher workload (e.g., during peak business hours) than the designated remote array.

Advantageously, illustrative embodiments provide techniques for using multi-pathing software to dynamically mark paths with higher latency as standby paths and direct IO operations to the remote array when there is higher latency in the local fabric. The MPIO layer monitors path latency values for paths to the local array, and when path latency values exceed latency values of the remote array latency, the MPIO layer uses remote array paths. As a result, applications achieve better IO performance and the impact of congestion in the local fabric is reduced.

These and other drawbacks of conventional practice are avoided in illustrative embodiments. As a result, such embodiments can provide improved performance in processing of IO operations. Moreover, these embodiments can facilitate data replication or migration across multiple storage systems using an active-active configuration, thereby providing more efficient protection against failures.

In one embodiment, an apparatus comprises a host device that includes an MPIO driver configured to control delivery of IO operations from the host device to first and second storage systems over a plurality of paths through a network. The MPIO driver is further configured to determine latency values for the plurality of paths to the first and second storage systems, to retrieve additional information corresponding to the plurality of paths and to the first and second storage systems, to generate a first message comprising, at least in part, at least portions of the latency values and the additional information, and to send the first message to a multi-pathing management appliance. A second message is received from the multi-pathing management appliance, the second message being generated based at least in part on at least a portion of the first message. The MPIO driver selects one or more paths of the plurality of paths for delivery of given ones of the IO operations to one of the first and second storage systems. The selection is based at least in part on at least a portion of the second message received from the multi-pathing management appliance.

The first and second storage systems in some embodiments are arranged in an active-active configuration relative to one another, although other arrangements are possible in other embodiments.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
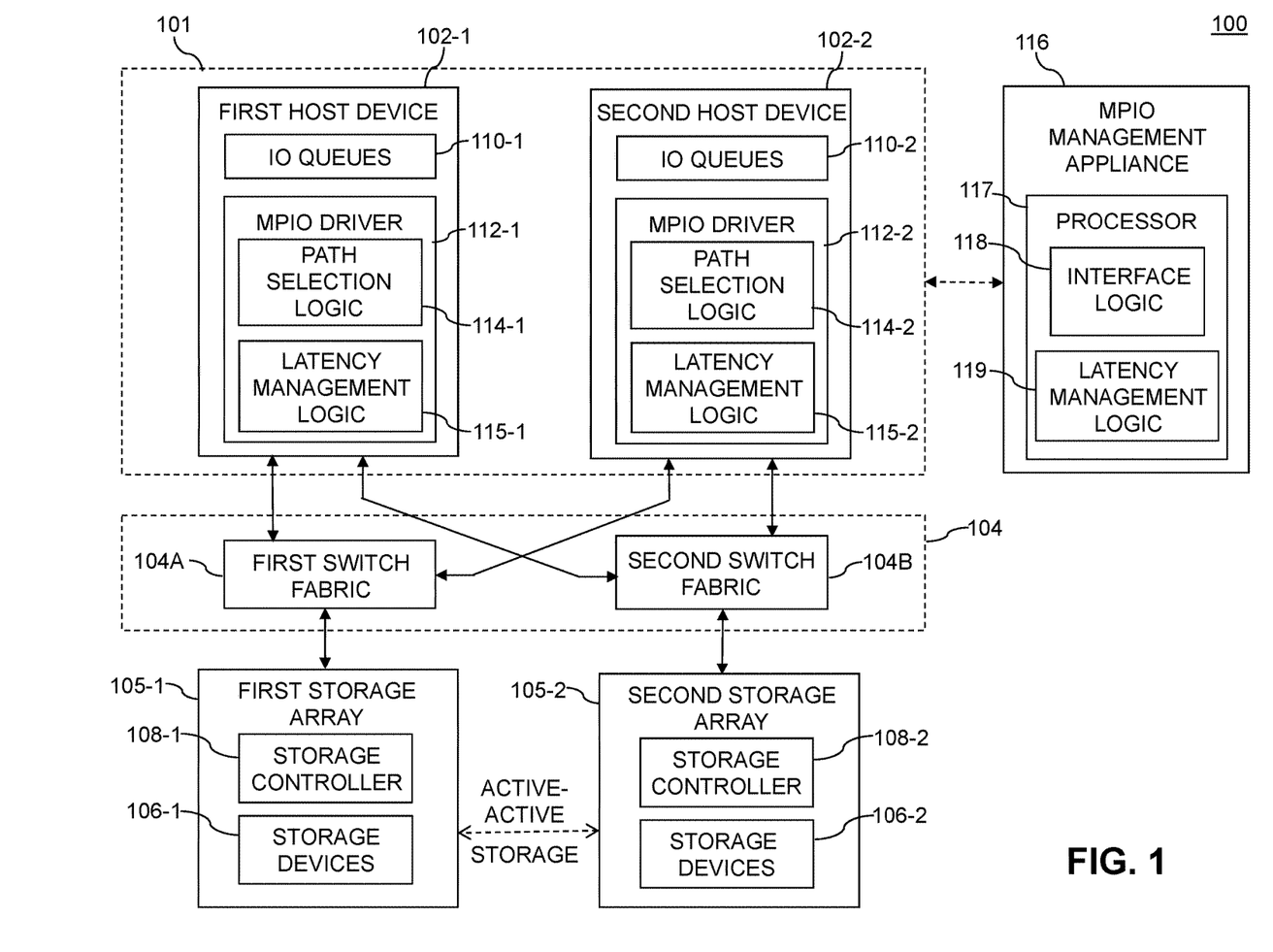
FIG. 1 is a block diagram of an information processing system configured with a multi-path layer of a host device and a multi-pathing management appliance with functionality for managing latency in an illustrative embodiment.

FIG. 1 shows an information processing system 100 configured in accordance with an illustrative embodiment. The information processing system 100 comprises a computer system 101 that includes at least first and second host devices 102-1 and 102-2, collectively referred to herein as host devices 102. The host devices 102 are coupled to a network 104 that comprises at least first and second switch fabrics 104A and 104B. The host devices 102 communicate over the network 104 via switch fabrics 104A and 104B with at least first and second storage arrays 105-1 and 105-2, collectively referred to herein as storage arrays 105. For example, the network 104 illustratively comprises at least one storage area network (SAN) and the switch fabrics 104A and 104B illustratively comprise respective distinct switch fabrics of a set of multiple switch fabrics interconnecting the host devices 102 with the storage arrays 105 over the one or more SANs. Each of the switch fabrics 104A and 104B in some embodiments is associated with a different SAN.

The system 100 is configured such that the first host device 102-1 communicates with the first storage array 105-1 over the first switch fabric 104A and communicates with the second storage array 105-2 over the second switch fabric 104B. Similarly, the second host device 102-2 communicates with the first storage array 105-1 over the first switch fabric 104A and communicates with the second storage array 105-2 over the second switch fabric 104B. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102, two switch fabrics 104A and 104B and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage arrays 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, a given storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Small Computer System Interface (SCSI), Internet SCSI (iSCSI), Serial Attached SCSI (SAS) and Serial Advanced Technology Attachment (SATA). Numerous other interfaces and associated communication protocols can be used in other embodiments.

The storage arrays 105 in some embodiments may be implemented as part of cloud infrastructure in the form of a cloud-based system. Such a cloud-based system can additionally or alternatively be used to implement other portions of system 100, such as the host devices 102 and the MPIO management appliance 116 described further herein.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage array 105 of network 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the network 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "TO" should be understood to refer to input and/or output. Thus, an TO operation relates to at least one of input and output.

The storage devices 106 of the storage array 105 of network 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the network 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

A given storage array 105 in the present embodiment are assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage arrays 105-1 and 105-2 are illustratively arranged in an active-active storage configuration, although other storage configurations can be used in other embodiments. In an example of an active-active storage configuration that may be used, data stored in one of the storage arrays 105 is replicated to the other one of the storage arrays 105 utilizing a synchronous replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active storage configurations include "metro" or "stretched" high availability storage array configurations. The term "active-active storage configuration" as used herein is therefore intended to be broadly construed.

The storage arrays 105-1 and 105-2 are therefore assumed to be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

The synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. Thus, while one or more embodiments illustratively described herein apply to synchronous replication, the system may also be configured for asynchronous replication.

It is assumed that the storage controllers 108 of the respective storage arrays 105 each comprise replication control logic and a snapshot generator. The replication control logic illustratively controls performance of the above-noted synchronous replication process, or other replication processes in other embodiments. The snapshot generator is used to generate snapshots of one or more storage volumes that are subject to synchronous replication in conjunction with active-active storage clustering. Again, other types of storage configurations can be used in other embodiments.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112. The multi-path layer further provides functionality for latency management. Such functionality is provided at least in part using respective instances of latency management logic 115-1 and 115-2 implemented within the MPIO drivers 112. In one or more embodiments, the latency management logic 115-1 and 115-2 in combination with the path selection logic 114-1 and 114-2 controls over which paths IO operations are sent to the storage arrays 105-1 and 105-2.

The MPIO drivers 112 may comprise, for example, otherwise conventional MPIO drivers, such as PowerPath® drivers from Dell Technologies, suitably modified in the manner disclosed herein to provide functionality for latency management. Other types of MPIO drivers from other driver vendors may be suitably modified to incorporate functionality for latency management as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management appliance 116 that includes a processor 117 implementing interface logic 118 and latency management logic 119. The interface logic 118 is utilized to communicate with the host devices 102. As described in more detail herein, the latency management logic 119 of the MPIO management appliance 116 is used in connection with management of latencies associated with the storage arrays 105 based on data collected by the latency management logic 115-1 and 115-2 of the MPIO drivers 112-1 and 112-2. Such an MPIO management appliance 116 provides management functionality for the multi-path layer comprising the MPIO drivers 112 of the host devices 102. In some embodiments, host device management software executing on the MPIO management appliance 116 interacts with storage array management software executing on the storage array 105. The MPIO management appliance 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management appliance 116 is an example of what is more generally referred to herein as an "external server" relative to the storage array 105. Additional or alternative external servers of different types can be used in other embodiments. In some embodiments, one or more external servers, such as the MPIO management appliance 116, perform at least a portion of the functionality for providing latency management as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a vendor unique (VU) command, or combinations of multiple instances of these or other commands, in an otherwise standardized storage access protocol command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well as to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

In one or more embodiments, the MPIO management appliance 116 is arranged as an intermediary device relative to the host devices 102 and the storage arrays 105. Some communications between the host devices 102 and the storage arrays 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management appliance 116.

As indicated previously, the host devices 102 communicate directly with the storage arrays 105 using one or more storage access protocols such as SCSI, Internet SCSI (iSCSI), SCSI over FC (SCSI-FC), NVMe over FC (NVMe/FC), NVMe over Fabrics (NVMeoF), NVMe over TCP (NVMe/TCP), and/or others. The MPIO management appliance 116 in some embodiments is similarly configured to communicate directly with the host devices 102 and/or the storage arrays 105 using one or more such storage access protocols.

The MPIO driver 112-1 on the host device 102-1 illustratively has connectivity to the MPIO management appliance 116. The MPIO management appliance 116 in some embodiments implements PowerPath® Management Appliance (PPMA) functionality to obtain access to the host devices 102 and the storage array 105. The MPIO management appliance 116 can obtain from the MPIO driver 112-1 certain types of IO operations path data and storage array related information for use in various latency management operations performed at least in part by the MPIO management appliance 116. Host multi-pathing software can be used to implement a multi-path layer comprising MPIO drivers 112 of respective host devices 102 as well as related management appliance software such as the above-noted PPMA of MPIO management appliance 116. Such host multi-pathing software can be configured to facilitate providing latency detection and management as disclosed herein. For example, multi-pathing software residing on one or more of the host devices 102 (e.g., a server such as an ESXi server or an AIX server) is utilized in illustrative embodiments to support determination and communication of path latency information for paths to the storage arrays 105-1 and 105-2 from one or more of the host devices 102 to the MPIO management appliance 116, and communication of one or more directives from the MPIO management appliance 116 to the host devices 102 to address latency issues.

As is apparent from the foregoing, MPIO driver 112-1 of host device 102-1 is configured with path selection logic 114-1 to control delivery of IO operations from the host device 102-1 to the first and second storage arrays 105 over selected paths through the network 104. In addition, MPIO driver 112-1 of host device 102-1 is configured with latency management logic 115-1, which provide techniques for using multi-pathing software to dynamically classify paths to a given one of the storage arrays 105 with higher latency values as standby paths and direct IO operations to a remaining one of the storage arrays 105 corresponding to paths with lower latency values. As noted herein, during an initial configuration an MPIO driver 112-1 designates an array with the least latency as the local (e.g., active) array and an array with higher latency as the remote (e.g., standby) array. According to the embodiments, latency management logic 115-1 monitors path latency values for paths to the local array, and when path latency values of the local array exceed latency values of the remote array (e.g., when there is higher latency in the local switch fabric as compared to the remote switch fabric), the MPIO driver 112-1 sends a message with details about the latency differences to the MPIO management appliance 116. In one or more scenarios, based on the received data, the latency management logic 119 of the MPIO management appliance 116 provides instructions back to the MPIO driver 112-1 to use paths to the remote array to deliver IO operations from the host device 102-1. As a result, applications running on the host device 102-1 achieve better IO performance and the impact of congestion in the local fabric is reduced. For example, assuming the first storage array 105-1 is the local array and the second storage array 105-2 is the remote array, higher levels of congestion through the first switch fabric 104A than the second switch fabric 104B may cause the first storage array 105-1 to have a higher latency than the second storage array 105-2.

According to an embodiment, the MPIO drivers 112 report certain types of information to the MPIO management appliance 116. For example, in one or more embodiments, the reported information includes detected storage area network (SAN) latency values for each initiator-target combination (IT nexus) in the local and remote arrays, details of array paths which have been detected as autostandby proximity (asb:prox) paths, and Fibre Channel Identifier (FCID) information, which is used to determine to which switch fabric an initiator is connected. Proximity based autostandby is used to determine which paths are to the remote array and which are to the local array. For example, in an initial configuration, the MPIO driver 112-1 sets paths with latencies above a given threshold as "asb:prox," and paths below the threshold to "active."

The MPIO driver 112-1 uses path latency threshold codes (e.g., SCSI, NVMe based codes) in connection with reporting latency for each path to the MPIO management appliance 116. When the MPIO driver 112-1 detects path latency values corresponding to a given one of the storage arrays 105 designated a local array which are higher than the path latency values detected for the paths to another one of the storage arrays 105 designated as the remote array, the MPIO driver 112-1 notifies the MPIO management appliance 116 with details of the array having the higher latency values. Such details may include, for example, array identifiers such as, but not necessarily limited to, World Wide Numbers (WWNs) or World Wide Identifiers (WWIDs), switch fabric identifiers (e.g., FCIDs, etc.), the number of paths for the array and the latency values of each path. In some embodiments, the MPIO driver 112-1 triggers SAN latency commands (e.g., SCSI, NVMe based commands) to target ports to gather information whether higher latencies are caused by the switch fabrics 104A and 104B.

The embodiments include situations where multiple host devices 102 are sending 10 operations over multiple paths through multiple switch fabrics 104A/104B. For example, the number of host devices 102 and paths may be on the order of hundreds or thousands. The latency management logic 119 of the MPIO management appliance 116 determines from which host devices 102 the higher latencies (e.g., latency values higher for a designated local array than a designated remote array) have been reported, and based on, for example, FCIDs, determines the switch fabrics 104A/104B associated with the higher latencies. The latency management logic 119 further identifies all host devices 102 which have distributed volumes from the same one of the storage arrays 105 and the same one of the switch fabrics 104A/104B. For the set of host devices 102 which have been identified as being associated with the higher latencies and having distributed volumes from the same one of the storage arrays 105 and the same one of the switch fabrics 104A/104B, the latency management logic 119 selects a subset of the host devices 102 and generates instructions for the latency management logic 115 of the subset of host devices 102 to change their IO operation paths to paths to the designated remote storage array. For example, the latency management logic 119 issues commands (e.g., SCSI, NVMe based commands) to the selected subset of host devices 102 to change paths designated as asb:prox to active. Advantageously, making path state changes to only a subset of the host devices 102 connected to the same one of the switch fabrics prevents overloading of a given switch fabric and addresses latency issues caused by IO operation load patterns.

According to one or more embodiments, following the changing of path status, the MPIO driver 112-1 and/or the MPIO management appliance 116 continues to monitor SAN latency values for local and remote array paths. For example, if SAN latency values for the local storage array improve to less than latency values of the remote paths, such improved latency values are detected by the MPIO drivers 112 of the subset of host devices 102 and/or are reported to the MPIO management appliance 116 as being less than remote array paths. In this case, the MPIO drivers 112 of the host devices can revert and/or the MPIO management appliance 116 can issue commands to the host devices 102 of the subset to revert to previous settings after a predetermined time period of the lower latency associated with the local array. Advantageously, the MPIO drivers 112 and the MPIO management appliance 116 use information about fabrics and host device path health to make multi-pathing decisions to achieve optimal load balancing.

The above-described functions associated with latency management of the MPIO driver 112-1 and of the MPIO management appliance 116 are illustratively carried out at least in part under the control of the latency management logic 115-1 of the MPIO driver 112-1 and of the latency management logic 119 of the MPIO management appliance 116. For example, the latency management logic 115-1 and/or the latency management logic 119 are illustratively configured to control performance of the steps of the flow diagram and subsequent steps to be described below in conjunction with FIG. 2.

It is assumed that the other MPIO driver 112-2 and other MPIO drivers of host devices not shown are configured in a manner similar to that described above and elsewhere herein for the first MPIO driver 112-1. The MPIO driver 112-2 and other MPIO drivers of host devices not shown are therefore similarly configured to select IO operations from their corresponding the sets of IO queues (e.g., IO queues 110) for delivery to the storage arrays 105 over the network 104 and to perform the disclosed latency management functionality. Accordingly, latency management functionality described above in the context of the first MPIO driver 112-1 is assumed to be similarly performed by the other MPIO driver 112-2, and by MPIO drivers of host devices not shown.

In the FIG. 1 embodiment, the network 104 comprises first and second switch fabrics 104A and 104B through which the first and second host devices 102-1 and 102-2 are cross-connected to the first and second storage arrays 105-1 and 105-2 as shown. In a cross-connected arrangement of this type, supporting active-active storage configuration of the storage arrays 105 for the multiple host devices 102, use of conventional path selection in the MPIO drivers 112 of host devices 102 may be employed in illustrative embodiments.

The MPIO drivers 112 may be otherwise configured utilizing well-known MPIO functionality. Such conventional MPIO functionality is suitably modified in illustrative embodiments disclosed herein to support latency management functionality.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114, latency management logic 115 and latency management logic 119 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising one or more host devices and first and second storage systems. The first and second storage systems in this embodiment are assumed to comprise respective first and second storage arrays arranged in an active-active configuration, with each storage array comprising a plurality of storage devices. The storage devices of the first and second storage arrays are assumed to include logical storage devices such as LUNs or other logical storage volumes.

Figure 2:
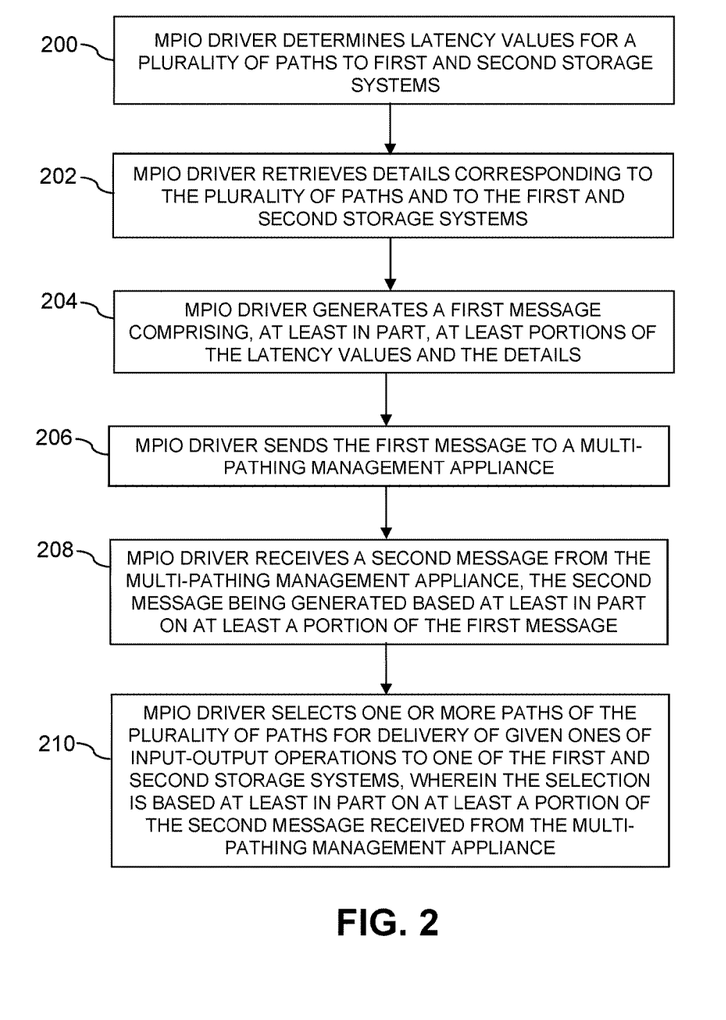
FIG. 2 is a flow diagram of a process for managing latency in an illustrative embodiment.

The steps of the FIG. 2 process are illustratively performed primarily by or under the control of an MPIO driver of a given host device, such as the MPIO driver 112-1 of the first host device 102-1 of system 100, although other arrangements of system components can perform at least portions of one or more of the steps in other embodiments. The functionality of the FIG. 2 process and subsequently described steps is illustratively performed in conjunction with algorithms executed by the path selection logic 114-1, latency management logic 115-1 of the MPIO driver 112-1, as well as by latency management logic 119 of MPIO management appliance 116.

In step 200, an MPIO driver determines latency values for the plurality of paths to the first and second storage systems. In one or more embodiments, one storage system of the first and second storage systems is designated as a local storage system and the other storage system of the first and second storage systems is designated as a remote storage system. The MPIO driver determines whether latency values for one or more paths to the local storage system are higher than latency values for one or more paths to the remote storage system. The latency values comprise, for example, storage area network latency values for respective initiator-target pairs corresponding to the plurality of paths to the first and second storage systems.

In step 202, the MPIO driver retrieves details corresponding to the plurality of paths and to the first and second storage systems. As used herein, the term "details" is an example of what is more generally referred to herein as "additional information" corresponding to, for example, an indication of which of the plurality of paths have been identified as autostandby proximity (asb:prox) paths, FCID information corresponding to the plurality of paths, array identifiers and the number of paths corresponding to a given array. In one or more embodiments, the MPIO driver generates one or more commands to one or more target ports in the plurality of paths to obtain information corresponding to whether one or more of the latency values are due to a fabric issue.

In step 204, the MPIO driver generates a first message comprising, at least in part, at least portions of the latency values and the details, and in step 206, the MPIO driver sends the first message to a multi-pathing management appliance (e.g., MPIO management appliance). In step 208, the MPIO driver receives a second message from the multi-pathing management appliance, the second message being generated based at least in part on at least a portion of the first message.

In step 210, the MPIO driver selects one or more paths of the plurality of paths for delivery of given ones of IO operations to one of the first and second storage systems, the selection is based at least in part on at least a portion of the second message received from the multi-pathing management appliance. The second message from the multi-pathing management appliance is based at least in part on the latency values for one or more paths to a given storage system of the first and second storage systems being higher than the latency values for one or more paths to the remaining storage system of the first and second storage systems, and comprises an instruction to utilize paths corresponding to the remaining storage system.

The multi-pathing management appliance is configured to receive, in addition to the first message from the host device, a plurality of messages from a plurality of additional host devices, the plurality of messages comprising, at least in part, additional latency values and additional details for additional paths to the first and second storage systems over the network. The multi-pathing management appliance identifies a group of host devices from the host device and the plurality of additional host devices, wherein the group of host devices utilizes a given storage system of the first and second storage systems associated with higher latency values than a remaining storage system of the first and second storage systems. The multi-pathing management appliance selects a subset of host devices from the group of host devices, and provides an instruction to the subset of host devices to utilize the remaining storage system. The group of host devices utilizes the same switch fabric.

In some embodiments, the MPIO driver determines, after a given time period, that one of the first and second storage systems to which IO operations were switched due to higher latency of the other storage system, exhibits lower latency values than the other storage system. Responsive to this determination, the MPIO driver reverts to using the other storage system.

Different instances of the FIG. 2 process can execute at least in part in parallel with one another for different extended copy commands. Also, multiple additional instances of the FIG. 2 process are assumed to be performed in respective ones of one or more additional host devices that share multiple storage arrays arranged in an active-active configuration.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and latency management functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different active-active arrangements in the event of a failure within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
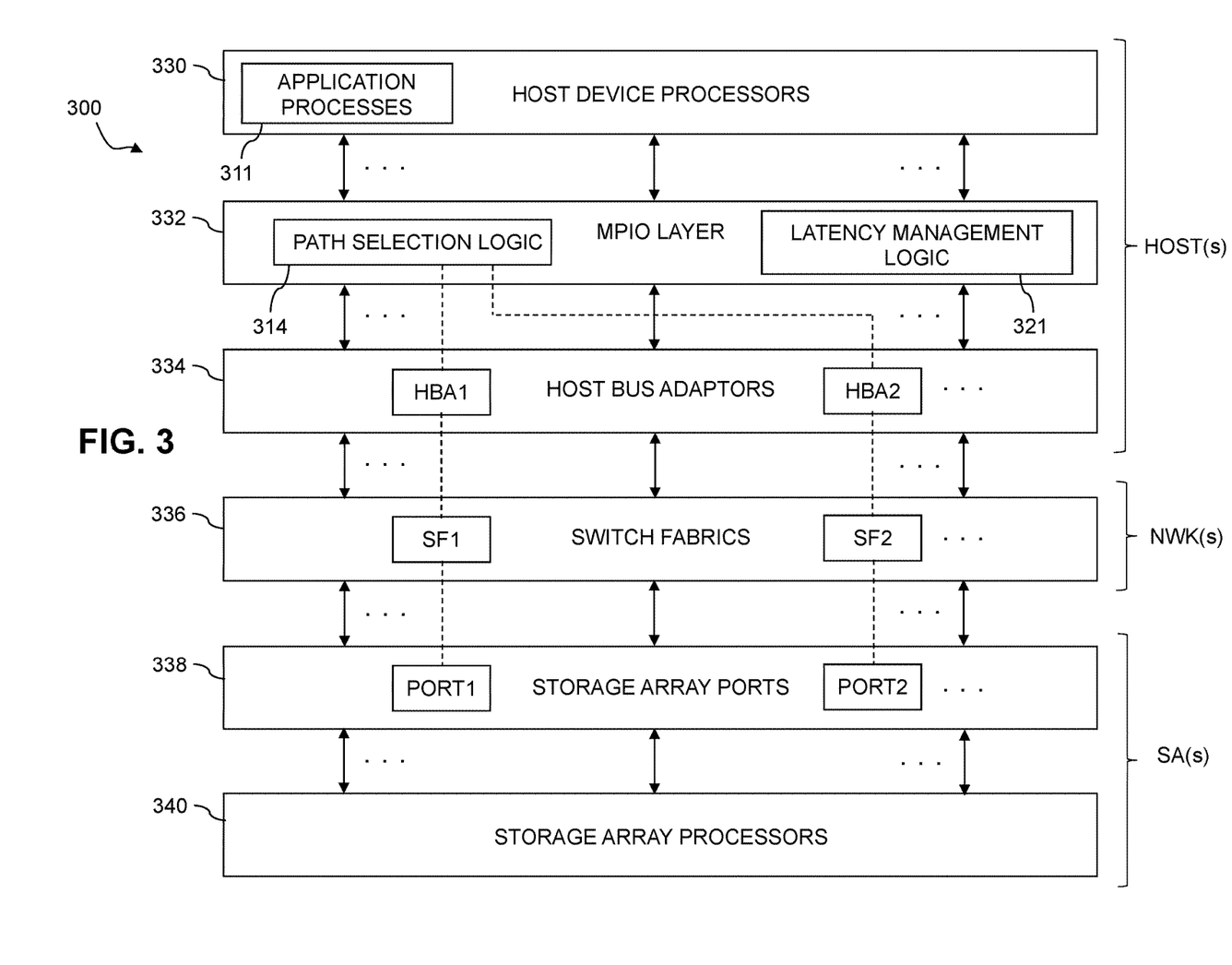
FIG. 3 is a block diagram showing multiple layers of a layered system architecture that includes a multi-path layer with functionality for managing latency in an illustrative embodiment.

Referring now to FIG. 3, another illustrative embodiment is shown. In this embodiment, an information processing system 300 comprises host-side elements that include application processes 311, path selection logic 314 and latency management logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices ("HOSTs"), the switch fabric layer 336 is associated with one or more SANs or other types of networks ("NWKs"), and the storage array port layer 338 and storage array processor layer 340 are associated with one or more storage arrays ("SAs").

The system 300 in this embodiment effectively handles 10 path, array, host connectivity and RDF link failures without third party mediator (e.g., witness) arrays. The embodiments utilize latency management logic 321 to dynamically mark paths with higher latency as standby paths and direct IO operations to a designated remote array when there is higher latency in the fabric corresponding to the designated local array. The MPIO layer 332 monitors path latency values for paths to the local array, and when path latency values exceed latency values of the remote array latency, the MPIO layer 332 controls 10 operations so that remote array paths are used. As a result, applications achieve better IO performance and the impact of congestion in the local fabric is reduced.

The MPIO layer 332 is an example of what is also referred to herein as a multi-path layer, and comprises one or more MPIO drivers implemented in respective host devices and/or an MPIO management appliance. Each such MPIO driver and MPIO management appliance illustratively comprise instances of latency management logic 321, which dynamically manage IO operations so that paths to arrays with less latency are used, substantially as previously described. Additional or alternative layers and latency management logic arrangements can be used in other embodiments. As mentioned previously, different instances of the above-described latency management processes can be performed by different MPIO drivers in different host devices.

In the system 300, the application processes 311 generate IO operations that are processed by the MPIO layer 332 for delivery to the one or more storage arrays. Path selection logic 314 is configured to select different paths for sending the IO operations from a given host device to a storage array. The path selection logic 314 in combination with inputs from the latency management logic 321 controls the distribution of IO operations over different paths to different storage arrays. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2. These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations and/or commands to the one or more storage arrays having the storage array ports of the storage array port layer 338. In selecting the paths, the path selection logic 314 illustratively limits amounts of IO operations and/or commands that are delivered over one or more paths to particular ones of the ports of a storage array.

In this embodiment, the host devices through their respective MPIO drivers and respective instances of path selection logic 314 and latency management logic 321 provide, possibly with involvement of other host device components, functionality for dynamic management of IO operations so that paths to arrays with less latency are used. In addition, the MPIO management appliance through its instance of latency management logic 321 provides functionality for dynamic latency management.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
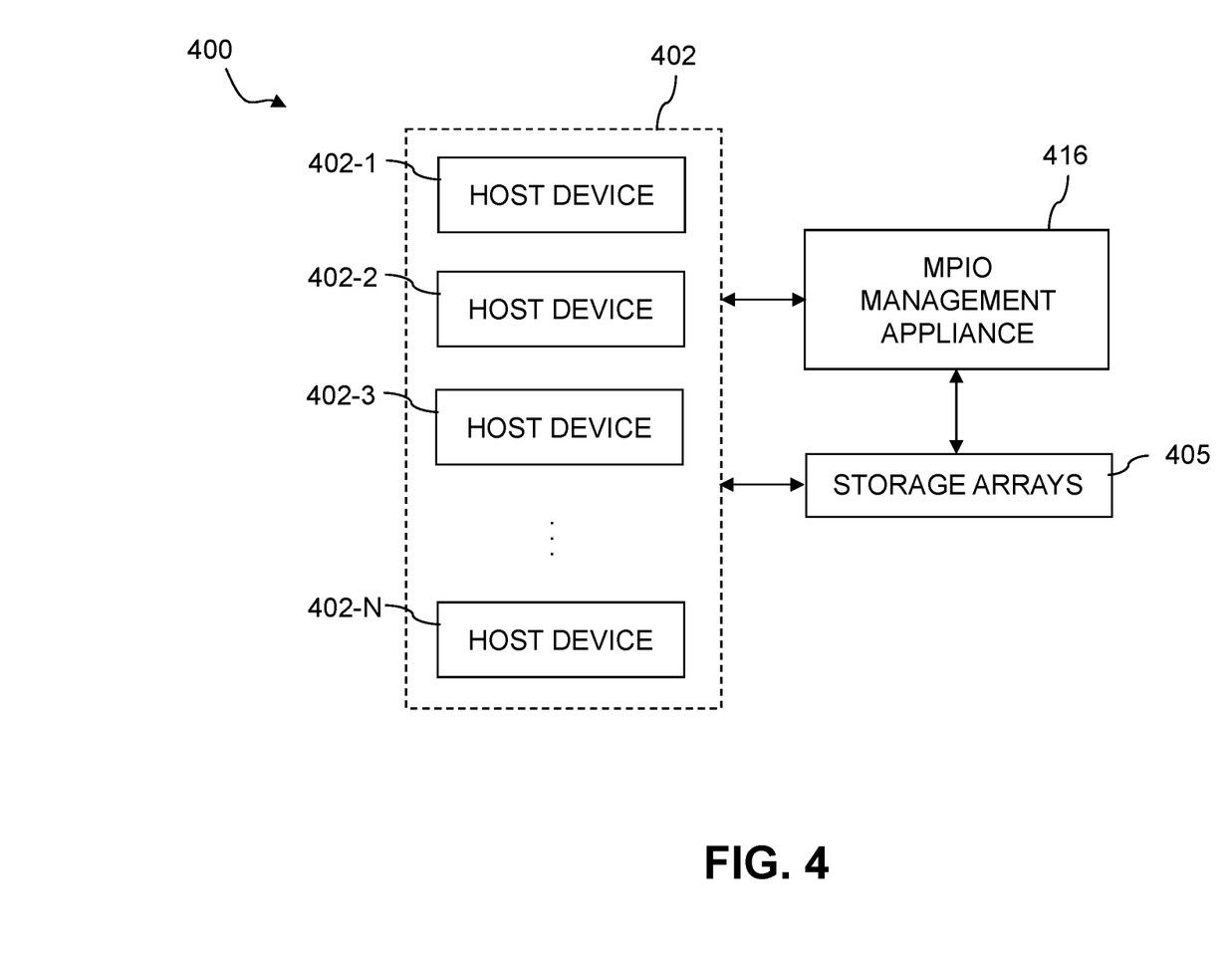
FIG. 4 is a block diagram illustrating an example interconnection arrangement between a multi-pathing management appliance, multiple host devices and a storage array in an illustrative embodiment.

Referring now to FIG. 4, an information processing system 400 in another illustrative embodiment comprises a plurality of host devices 402, individually denoted as host device 402-1, host device 402-2, host device 402-3, . . . host device 402-N. The system 400 further comprises storage arrays 405, and an MPIO management appliance 416. It is assumed that each of the host devices 402 is in communication with the storage arrays 405 and the MPIO management appliance 416. In a process for managing latency in system 400, based at least in part on latency values for paths to a given storage array of the storage arrays 405 being higher than the latency values for paths to a remaining storage array of the storage arrays 405, the MPIO management appliance 416 illustratively generates commands for the MPIO drivers of the host devices 402 to utilize paths corresponding to the remaining storage array. The MPIO management appliance 416 is configured to receive a plurality of messages from the plurality of host devices 402, the plurality of messages comprising, at least in part, latency values and details for paths to the storage arrays 405 over a network.

The MPIO management appliance 416 identifies a group of the host devices 402 utilizing a given storage array of the storage arrays 405 associated with higher latency values than a remaining storage array of the storage arrays 405, and selects a subset of host devices from the group of host devices 402. The MPIO management appliance 416 provides commands to the subset of host devices to utilize the remaining storage array. The host devices 402 include logic to apply the received commands in IO operations so that dynamic management of latency can be achieved.

The particular arrangements for dynamically detecting and addressing higher latencies in one storage system when compared to another storage system described above are presented by way of illustrative example only. Numerous alternative arrangements of these and other features can be used in implementing latency management in other embodiments.

The illustrative embodiments disclosed herein can provide a number of significant advantages relative to conventional arrangements that only detect different path latencies during initial configuration, and fail to update designated active and standby arrays for path selection. Unlike conventional solutions, which are static, the embodiments advantageously address the dynamic nature of latency by accounting for the dynamic workload in a fabric, which can vary latency at any point in time. Advantageously, the embodiments enable MPIO drivers to identify when standby arrays exhibit lower latencies than active arrays and communicate such determinations to an MPIO management appliance. The MPIO management appliance advantageously selects a subset of the host devices having distributed volumes from the same array and same switch fabric, and makes changes to their path status from asb:prox to active. Making path state changes to only subset of the host devices avoids having too many host devices using the same storage array so that latencies caused by IO operation overload on a given storage array is prevented.

The embodiments advantageously address on-going and real-time changes in latency, which may occur due to, for example, workloads where multiple host devices have IO operations to the same array target port, workloads comprising significantly larger reads from host devices and fabric congestion due to, for example, faulty cable or small form-factor pluggable (SFP) switches.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114, latency management logic 115 and 119 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, MPIO management appliances, path selection logic, latency management logic and additional or alternative components. Also, the particular configurations of system and device elements and associated processing operations illustratively shown in the drawings can be varied in other embodiments. For example, a wide variety of different MPIO driver and/or MPIO management appliance configurations and associated latency management arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with first and second storage systems;
the host device comprising:
a multi-path input-output driver configured to control delivery of input-output operations from the host device to the first and second storage systems over a plurality of paths through the network;
wherein the multi-path input-output driver is further configured:
to determine latency values for the plurality of paths to the first and second storage systems;
to retrieve additional information corresponding to the plurality of paths and to the first and second storage systems;
to generate a first message comprising, at least in part, at least portions of the latency values and the additional information;
to send the first message to a multi-pathing management appliance;
to receive a second message from the multi-pathing management appliance, the second message being generated based at least in part on at least a portion of the first message; and to select one or more paths of the plurality of paths for delivery of given ones of the input-output operations to one of the first and second storage systems, wherein the selection is based at least in part on at least a portion of the second message received from the multi-pathing management appliance.

2. The apparatus of claim 1 wherein the first and second storage systems are arranged in an active-active configuration relative to one another.

3. The apparatus of claim 1 wherein one storage system of the first and second storage systems is designated as a local storage system and the other storage system of the first and second storage systems is designated as a remote storage system.

4. The apparatus of claim 3 wherein the multi-path input-output driver is further configured to determine whether latency values for one or more paths to the local storage system are higher than latency values for one or more paths to the remote storage system.

5. The apparatus of claim 1 wherein the latency values comprise storage area network latency values for respective initiator-target pairs corresponding to the plurality of paths to the first and second storage systems.

6. The apparatus of claim 1 wherein the additional information comprises an indication of which of the plurality of paths have been identified as autostandby proximity paths.

7. The apparatus of claim 1 wherein the additional information comprises Fibre Channel Identifier (FCID) information corresponding to the plurality of paths.

8. The apparatus of claim 1 wherein the multi-path input-output driver is further configured to generate one or more commands to one or more target ports in the plurality of paths to obtain information corresponding to whether one or more of the latency values are due to a fabric issue.

9. The apparatus of claim 1 wherein the multi-path input-output driver is further configured to determine whether latency values for one or more paths to a given storage system of the first and second storage systems are higher than latency values for one or more paths to the remaining storage system of the first and second storage systems.

10. The apparatus of claim 9 wherein the second message from the multi-pathing management appliance is based at least in part on the latency values for the one or more paths to the given storage system being higher than the latency values for the one or more paths to the remaining storage system, and comprises an instruction to utilize paths corresponding to the remaining storage system.

11. The apparatus of claim 1 wherein the multi-pathing management appliance is configured to receive, in addition to the first message from the host device, a plurality of messages from a plurality of additional host devices, the plurality of messages comprising, at least in part, latency values and additional information for additional paths to the first and second storage systems over the network.

12. The apparatus of claim 11 wherein the multi-pathing management appliance is further configured:
to identify a group of host devices from the host device and the plurality of additional host devices, wherein the group of host devices utilizes a given storage system of the first and second storage systems associated with higher latency values than a remaining storage system of the first and second storage systems;
to select a subset of host devices from the group of host devices; and
to provide an instruction to the subset of host devices to utilize the remaining storage system.

13. The apparatus of claim 12 wherein the group of host devices utilizes the same switch fabric.

14. The apparatus of claim 1 wherein the second message from the multi-pathing management appliance comprises an instruction to switch from using a given storage system of the first and second storage systems corresponding to higher latency values to using a remaining storage system of the first and second storage systems corresponding to lower latency values.

15. The apparatus of claim 14 wherein the multi-path input-output driver is further configured:
to determine after a given time period that the given storage system corresponds to lower latency values than the remaining storage system; and
to revert to using the given storage system based at least in part on the determination.

16. A method comprising:
configuring a multi-path input-output driver of a host device to control delivery of input-output operations from the host device to first and second storage systems over a plurality of paths through a network;
the multi-path input-output driver:
determining latency values for the plurality of paths to the first and second storage systems;
retrieving additional information corresponding to the plurality of paths and to the first and second storage systems;
generating a first message comprising, at least in part, at least portions of the latency values and the additional information;
sending the first message to a multi-pathing management appliance;
receiving a second message from the multi-pathing management appliance, the second message being generated based at least in part on at least a portion of the first message; and
selecting one or more paths of the plurality of paths for delivery of given ones of the input-output operations to one of the first and second storage systems, wherein the selection is based at least in part on at least a portion of the second message received from the multi-pathing management appliance.

17. The method of claim 16 wherein the multi-path input-output driver further performs the step of determining whether latency values for one or more paths to a given storage system of the first and second storage systems are higher than latency values for one or more paths to the remaining storage system of the first and second storage systems.

18. The method of claim 17 wherein the second message from the multi-pathing management appliance is based at least in part on the latency values for the one or more paths to the given storage system being higher than the latency values for the one or more paths to the remaining storage system, and comprises an instruction to utilize paths corresponding to the remaining storage system.

19. A computer program product comprising a non-transitory processor-readable storage medium having stored therein program code of one or more software programs, wherein the program code, when executed by a host device comprising a multi-path input-output driver, the multi-path input-output driver being configured to control delivery of input-output operations from the host device to first and second storage systems over a plurality of paths through a network, causes the multi-path input-output driver:
to determine latency values for the plurality of paths to the first and second storage systems;

to retrieve additional information corresponding to the plurality of paths and to the first and second storage systems;

to generate a first message comprising, at least in part, at least portions of the latency values and the additional information;

to send the first message to a multi-pathing management appliance;

to receive a second message from the multi-pathing management appliance, the second message being generated based at least in part on at least a portion of the first message; and to select one or more paths of the plurality of paths for delivery of given ones of the input-output operations to one of the first and second storage systems, wherein the selection is based at least in part on at least a portion of the second message received from the multi-pathing management appliance.

20. The computer program product of claim 19 wherein the program code further causes the multi-path input-output driver to determine whether latency values for one or more paths to a given storage system of the first and second storage systems are higher than latency values for one or more paths to the remaining storage system of the first and second storage systems.

\* \* \* \* \*